(12) United States Patent
Mori

(10) Patent No.: US 12,515,446 B2
(45) Date of Patent: Jan. 6, 2026

(54) STRETCHABLE FILM

(71) Applicant: C.I.TAKIRON CORPORATION, Osaka (JP)

(72) Inventor: Keiichi Mori, Osaka (JP)

(73) Assignee: C.I.TAKIRON CORPORATION, Osaka (JP)

(*) Notice: Subject to any disclaimer, the term of this patent is extended or adjusted under 35 U.S.C. 154(b) by 292 days.

(21) Appl. No.: 18/259,948

(22) PCT Filed: Nov. 30, 2021

(86) PCT No.: PCT/JP2021/043906
§ 371 (c)(1),
(2) Date: Jun. 29, 2023

(87) PCT Pub. No.: WO2022/153695
PCT Pub. Date: Jul. 21, 2022

(65) Prior Publication Data
US 2024/0075725 A1    Mar. 7, 2024

(30) Foreign Application Priority Data
Jan. 13, 2021  (JP) .................................. 2021-003735

(51) Int. Cl.
*B32B 27/32* (2006.01)
*B32B 27/20* (2006.01)

(52) U.S. Cl.
CPC ............. *B32B 27/32* (2013.01); *B32B 27/20* (2013.01); *B32B 2307/51* (2013.01); *B32B 2307/724* (2013.01); *B32B 2323/046* (2013.01); *B32B 2323/10* (2013.01)

(58) Field of Classification Search
None
See application file for complete search history.

(56) References Cited

U.S. PATENT DOCUMENTS

| 4,613,643 A | 9/1986 | Nakamura et al. |
| 2007/0155900 A1* | 7/2007 | Chang ..................... B32B 5/022 525/88 |
| 2017/0203554 A1 | 7/2017 | Takahashi et al. |
| 2018/0133357 A1 | 5/2018 | Takeda et al. |
| 2018/0133951 A1 | 5/2018 | Takeda et al. |
| 2020/0362130 A1 | 11/2020 | Tanaka et al. |

(Continued)

FOREIGN PATENT DOCUMENTS

| CN | 107531916 A | 1/2018 |
| EP | 3284775 A1 | 2/2018 |
| JP | 2016-204625 A | 12/2016 |

(Continued)

OTHER PUBLICATIONS

Extended European Search Report for European Patent Application No. 2191954.9 dated May 6, 2024 (11 pages).

(Continued)

*Primary Examiner* — Ramsey Zacharia
(74) *Attorney, Agent, or Firm* — Buchalter, a Professional Corporation

(57) ABSTRACT

A stretchable film contains an olefin-based elastomer and an inorganic filler, has an air permeability measured by an Oken air permeability tester of 5000 s/100 ml or less, and a permanent strain in at least one direction of 20% or less.

6 Claims, 2 Drawing Sheets

(56) References Cited

U.S. PATENT DOCUMENTS

2021/0257165 A1    8/2021    Kato et al.

FOREIGN PATENT DOCUMENTS

| | | |
|---|---|---|
| JP | 2016-204634 A | 12/2016 |
| JP | 2017-031292 A | 2/2017 |
| JP | 2017-164996 A | 9/2017 |
| JP | 2017-164997 A | 9/2017 |
| WO | WO 2016-013577 A1 | 1/2016 |
| WO | WO 2016/167242 A1 | 10/2016 |
| WO | WO 2020-040301 A1 | 2/2020 |

OTHER PUBLICATIONS

Office Action for European Patent Application No. 21919584.9 dated Jan. 31, 2025 (6 pages).
International Search Report and Written Opinion for PCT/JP2021/043906 (ISA/JP) mailed Feb. 8, 2022 w/English translation (9 pages).
European Office Action for application No. 21919584.9, mailed Jun. 25, 2025, 6 pgs.

\* cited by examiner

STRETCHABLE FILM

CROSS REFERENCE TO RELATED APPLICATIONS

This application is a National Stage Application, filed under 35 U.S.C. § 371, of International Application No. PCT/JP2021/043906, filed Nov. 30, 2021, which international application claims priority to and the benefit of Japanese Application No. 2021-003735, filed Jan. 13, 2021; the contents of both of which are hereby incorporated by reference in their entirety.

BACKGROUND

Technical Field

The present disclosure relates to a stretchable film.

Description of Related Art

Stretchable films are used in a wide range of fields such as sanitary goods, sporting goods, and medical goods to improve handleability, wearing feeling (fitting feeling), and the like. For example, stretchable films are used for clothes such as underwear, a waistband of paper diapers, a side panel, a leg gather, an incontinence article, a sanitary napkin, a bandage, a surgical drape, a fastening band, a hat, swimming pants, a sports supporter, a medical supporter, and an adhesive plaster.

As this stretchable film, for example, a film has been suggested which contains: olefinic-based resin including an olefin-based elastomer; and a filler, with the content of the filler being 100 parts by weight to 300 parts by weight relative to 100 parts by weight of the olefin-based resin, and which has voids on its surface. It is stated that with such a configuration, a stretchable film having excellent stretchability and excellent breathability can be provided (e.g., see Japanese Unexamined Patent Publication No. 2016-204634).

BRIEF SUMMARY

However, in the stretchable film described in Japanese Unexamined Patent Publication No. 2016-204634, the olefin-based elastomer has stretchability and lacks breathability, resulting in a problem of stuffiness when wearing sanitary good and the like, which reduces usability.

Such a stretchable film is obtained by preparing an unstretched film using a material containing an inorganic filler such as calcium carbonate, followed by stretching of the unstretched film. Here, in general, when an inorganic substance is added to resin and the resin is stretched, separation occurs between the resin and the inorganic substance to form pores, and thus, breathability can be imparted. However, when a material having stretchability is subjected to the same treatment, the resin is stretched, separation does not occur between the resin and the inorganic substance, and thus breathability is not exhibited. As a result, it has been difficult to achieve both breathability and stretchability.

The present disclosure was made in view of the above problems, and an object of the present disclosure is to provide a stretchable film capable of achieving both excellent stretchability and excellent breathability.

In order to achieve the above object, the stretchable film of the present disclosure contains an olefin-based elastomer and an inorganic filler, the stretchable film having an air permeability measured by an Oken air permeability tester of 5000 s/100 ml or less, and the following permanent strain in at least one direction of 20% or less.

(Permanent Strain of Stretchable Film)

A strip-shaped test piece is cut from the stretchable film. The test piece has 100 mm in one direction of the film and 25 mm in a direction orthogonal to the one direction. This test piece is then fixed to grippers of the tester so that a distance between the gripers is 25 mm and elongated in a longitudinal direction at a speed 254 mm/min so that an elongation (elongation ratio) calculated by the following equation (1) is 100%. Immediately after the elongation, the test piece is contracted at the same speed, and the permanent strain [%] is calculated from the following equation (2).

$$\text{Elongation}[\%] = (L1-L0)/L0 \times 100 \quad (1)$$

$$\text{Permanent Strain}[\%] = (L2-L0)/L0 \times 100 \quad (2)$$

L0 is a distance (mm) between the grippers before the elongation, L1 is a distance (mm) between the grippers after the elongation, and L2 is a distance (mm) between the grippers when a load (N/25 mm) of the test piece becomes 0 during the contraction.

The present disclosure makes it possible to provide a stretchable film that can achieve both excellent stretchability and excellent breathability.

DETAILED DESCRIPTION OF VARIOUS EMBODIMENTS

Figure 1:
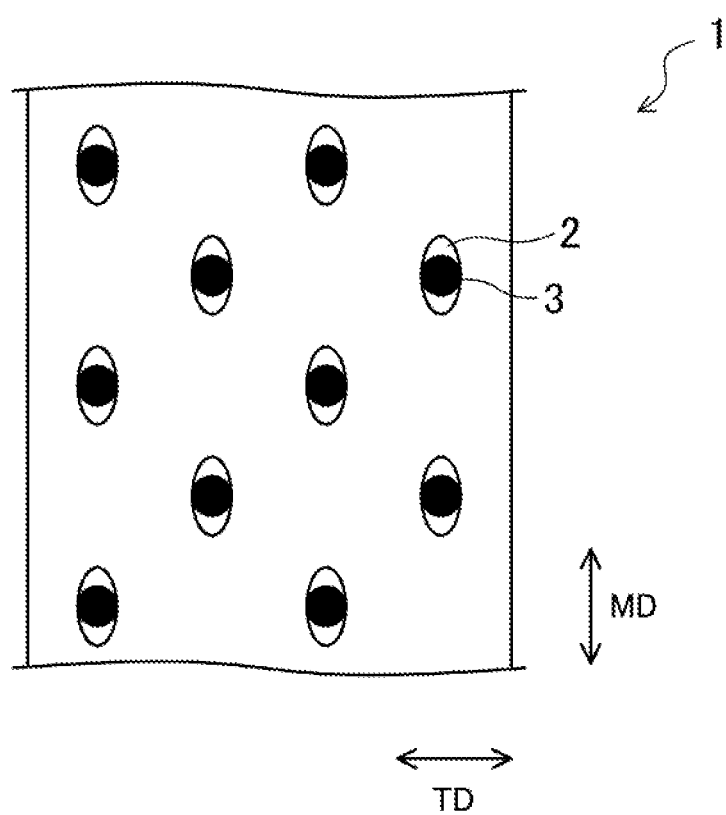
FIG. 1 is a plan view of a stretchable film according to a first embodiment of the present disclosure.

The stretchable film according to the present disclosure will be described in detail below. It should be noted that the present disclosure is not limited to the following embodiments and can be appropriately modified and applied without departing from the scope of the present disclosure.

First Embodiment

A stretchable film according to the present embodiment is a film-shaped molded article containing an olefin-based elastomer and an inorganic filler.

<Olefin-Based Elastomer>

The olefin-based elastomer used in the present disclosure can be, for example, a copolymer or homopolymer containing, as a main component, an olefin having 3 or more carbon atoms, or a copolymer with an olefin containing, as a main component, ethylene and having 3 or more carbon atoms.

Specific examples of the olefin-based elastomer includes: (1) α-olefin homopolymers such as a propylene homopolymer and 1-butene homopolymer, which have low stereoregularity; (2) α-olefin copolymers such as a propylene-ethylene copolymer, a propylene-ethylene-1-butene copolymer, 1-butene-ethylene copolymer, a 1-butene-propylene copolymer, a 4-methylpentene-1-propylene copolymer, 4-methylpentene-1-1-butene copolymer, 4-methylpentene-1-propylene-1-butene copolymer, a propylene-1-butene copolymer, an ethylene-propylene copolymer, an ethylene-hexene copolymer, and an etylene-octene copolymer; and (3) ethylene-α-olefin-diene terpolymers such as an etylene-propylene-ethylidene norbornene terpolymer, an etylene-propylene-butadiene terpolymer, and an ethylene-propylene-isoprene terpolymer. An elastomer in which an elastomer is dispersed in a matrix of crystalline polyolefin may also be used. One kind of these olefin-based elastomers may be used alone, or two or more kinds of them may be used in combination.

The olefin-based elastomer generally includes hard segments that govern basic physical properties such as mechanical properties and soft segments that govern stretchability which is rubber-like properties. The olefin-based elastomer including polypropylene as hard segments is referred to as propylene-based elastomer, and the olefin-based elastomer including polyethylene as hard segments is referred to as ethylene-based elastomer. Examples of the soft segments of the olefin-based elastomer include EPDM, EPM, EBM, IIR, hydrogenated styrene-butadiene rubber (HSBR), NBR, and acrylic rubber (ACM). For the propylene-based elastomer, the content of the propylene unit relative to total units is preferably 70 mass % to 95 mass %, more preferably 80 mass % to 90 mass %. When the content of the propylene unit, which are hard segments is 70 mass % or higher, the strength is improved, thereby obtaining excellent moldability, and when the content is 95 mass % or lower, excellent stretchability due to elasticity of the soft segments is obtained.

In light of obtaining excellent stretchability, the content of the olefin-based elastomer relative to the entire stretchable film is preferably from 15 mass % to 50 mass %, inclusive, more preferably from 20 mass % to 40 mass %, inclusive, relative to 100 mass % of the stretchable film. When the content of the propylene-based elastomer is within the range described above, excellent stretchability due to elasticity of the soft segments contained in the elastomer is obtained.

<Inorganic Filler>

The inorganic filler is a component for forming through holes by formation of pores. By stretching the stretchable film of this embodiment with the inorganic filler contained, the stretchable film can exhibit excellent breathability.

Examples of the inorganic filler include calcium carbonate, zeolite, silica, titanium oxide, calcium oxide, magnesium oxide, zinc oxide, clay, mica, barium sulfate, magnesium hydroxide, etc. One kind of these inorganic fillers may be used alone, or two or more kinds of them may be used in combination.

The content of the inorganic filler relative to the entire stretchable film is preferably from 50 mass % to 70 mass %, inclusive, more preferably from 60 mass % to 65 mass %, inclusive, relative to 100 mass % of the stretchable film. When the content of the inorganic filler is within the range described above, the stretching facilitates formation of pores.

The inorganic filler has a mean particle diameter of preferably 0.8 µm to 15 µm. When the inorganic filler has a mean particle diameter of 0.8 µm or more, secondary aggregation or the like of the inorganic filler is suppressed, and dispersibility in the resin becomes excellent. When the inorganic filler has a mean particle diameter of 15 µm or less, there are, for example, no holes due to drawdown during extrusion, resulting in excellent moldability.

The term "mean particle diameter" used herein refers to the particle diameter at 50% in the particle size distribution measured by a particle size distribution meter.

<Other Component>

The stretchable film may contain another component besides the olefin-based elastomer described above as long as the stretchability of the stretchable film is not impaired.

Examples of the other component include olefin-based resin, an amide-based antiblocking agent (such as octadecanamide), a plasticizer, an ultraviolet absorber, an antioxidant, a weathering agent, an antistatic agent, a colorant, an anti-fogging agent, metal soap, wax, an antifungal agent, an antibacterial agent, a nucleating agent, a flame retardant, a lubricant, etc. These other components may be added to the material for the stretchable film in the form of a master batch.

<Olefin-Based Resin>

The olefin-based resin preferably has compatibility with the olefin-based elastomer described above, and preferred examples thereof include polyethylene resin and polypropylene resin. One kind of these olefin-based resins may be used alone, or two or more kinds of them may be used in combination.

The polyethylene resin used can be, for example, low-density polyethylene (LDPE), linear low-density polyethylene (LLDPE), or ultra low-density polyethylene (ULDPE).

In light of improving air permeability by contributing to fixation of pores, the content of the olefin-based resin relative to the entire stretchable film is preferably less than 10 mass % relative to 100 mass % of the stretchable film. This is because when the content of the olefin-based resin is 10 mass % or higher, stretchability of the film is significantly deteriorated because normal polyethylene itself has no stretchability.

In light of improving air permeability, it is preferable that low-density polyethylene is used as the polyethylene resin and that the content of the low-density polyethylene relative to the entire stretchable film is less than 10 mass %.

<Through Hole>

FIG. 1 is a plan view of the stretchable film according to this embodiment. As illustrated in FIG. 1, the stretchable film 1 according to the present disclosure has multiple through holes 2. The through holes 2 are formed by stretching a raw film before formation of pores, as described below.

FIG. 1 shows a stretchable film after stretching the film in a mechanical axis (longitudinal) direction (hereinafter referred to as "MD"), but when the film is stretched in the direction orthogonal to the MD (hereinafter referred to as "TD"), through holes 2 elongated in the TD are formed.

The stretchable film 1 according to the present embodiment is configured such that the raw film containing the inorganic filler 3 described above is stretched to form pores.

Each of the through holes 2 has a diameter of preferably 1 µm to 100 µm. When the through hole 2 has a diameter of 1 µm or more, excellent breathability can be obtained without blocking the pores even in a stretchable material such as an elastomer, and when the through hole 2 has a diameter of 100 µm or less, waterproofness can be obtained.

The diameter of the through hole 2 is an average value of diameters of openings of 50 through holes 2 selected at random.

<Method for Producing Stretchable Film>

Next, a method for producing the stretchable film according to the present embodiment will be described in detail below.

The stretchable film according to the present embodiment is produced by molding a raw material containing the olefin-based elastomer and inorganic filler described above into a film shape using an extruder.

Specifically, first, the olefin-based elastomer and the inorganic filler, and another optional component such as the olefin-based resin described above are mixed in a predetermined mixing ratio, and the resultant mixture is then extruded in the form of a strand by, for example, a co-rotation twin screw extruder equipped with a strand die and cut to obtain pellets.

Next, these pellets are melt-extruded in a single screw extruder equipped with a T-die to form a film, and the film is wound up by a wind-up roll, thereby obtaining a raw film before formation of pores.

The raw film is monoaxially stretched to form pores in the raw film, thereby producing a stretchable film 1 having multiple through holes 2 shown in FIG. 1. The stretching method is not particularly limited, and examples thereof include roll stretching, tenter stretching, gear stretching, etc.

The monoaxial stretching described above is stretching in one of MD or TD shown in FIG. 1. Biaxial stretching of stretching in both MD and TD may also be performed.

The stretching temperature in the monoaxial stretching is 20° C. or higher and lower than 70° C. This is because if the stretching temperature is lower than 20° C., the through holes formed due to the stretchability of the olefin-based elastomer are blocked, and sufficient moisture permeability may not be obtained. When the stretching temperature is 70° C. or higher, the stretchable film may melt and be ruptured.

The stretch ratio in the monoaxial stretching is 1.8 times or more and 6 times or less. The stretch ratio of 1.8 times or more facilitates the formation of pores by stretching, thereby further improving moisture permeability of the stretchable film, but the stretch ratio of more than 6 times may cause the film to be ruptured when stretched. The term "stretch ratio" used herein refers to multiples of the length of the film after stretching in the stretching direction with respect to the length of the film before the stretching.

The stretchable film according to the present embodiment produced by the method described above has an air permeability measured by an Oken air permeability tester of 5000 s/100 ml or less and thus has excellent breathability.

The stretchable film according to the present embodiment has a permanent strain of 20% or less and thus has excellent stretchability.

The term "permanent strain" used herein refers to a strain calculated by the following method.

A strip-shaped test piece is cut from the stretchable film. The test piece has 100 mm in one direction of the film and 25 mm in the direction orthogonal to the one direction. The test piece is then fixed to grippers of a precision universal tester (Autograph AG-5000A manufactured by SHIMADZU CORPORATION) so that the distance between the grippers becomes 25 mm. The test piece is elongated in the longitudinal direction at a speed 254 mm/min so that an elongation (elongation ratio) calculated by the following equation (1) becomes 100%. Immediately after the elongation, the test piece is contracted at the same speed. The permanent strain [%] is then calculated from the following equation (2).

$$\text{Elongation}[\%]=(L1-L0)/L0\times100 \quad (1)$$

$$\text{Permanent Strain}[\%]=(L2-L0)/L0\times100 \quad (2)$$

L0 is a distance (mm) between the grippers before the elongation, L1 is a distance (mm) between the grippers after the elongation, and L2 is a distance (mm) between the grippers when a load (N/25 mm) of the test piece becomes 0 during the contraction.

The raw film before stretching has a thickness of preferably 10 µm to 80 µm, more preferably 20 µm to 60 µm. When the thickness of the raw film is 10 µm or more, there is less wrinkling during winding, so that the ease of handling, such as the ease of cutting in trimming at the time of slitting, can be ensured. In addition, when the thickness of the raw film is 80 µm or less, the stretchable film after the stretching can obtain sufficient breathability.

The thickness of the stretchable film after the stretching is 40% to 60% of the raw film when heat stretching is performed, and is 80% to 100% of the raw film when the stretching is performed at room temperatures. For the gear stretching, an unstretched portion has the same thickness as that of the raw film, and a stretched portion is 80% to 100% of the raw film.

In the present embodiment, a stretchable film having both excellent stretchability and excellent breathability can be obtained by the method described above.

The stretchable film may be a single layer or a multilayer including two or more layers. When the stretchable film is a multilayer, the composition and thickness of each layer may be the same as or different from each other. When the stretchable film is a multilayer, the thickness thereof means the entire thickness of the multilayer.

Second Embodiment

Next, the second embodiment of the present disclosure will be described. The same components as those of the first embodiment are denoted by the same reference numerals, and description thereof is omitted.

Figure 2:
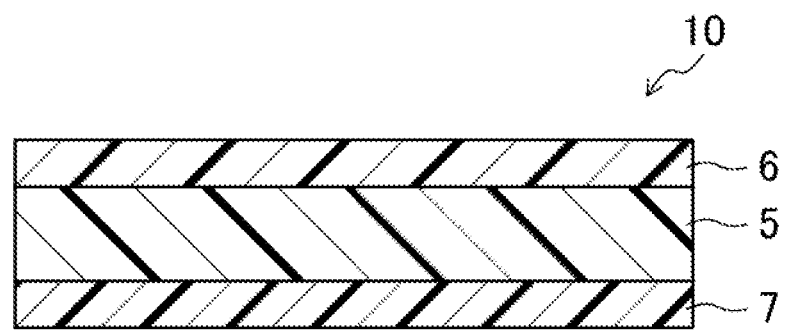
FIG. 2 is a sectional view of a stretchable film according to a second embodiment of the present disclosure.

FIG. 2 is a sectional view of a stretchable film according to a second embodiment of the present disclosure. As shown in FIG. 2, the stretchable film 10 of the present embodiment includes: an elastomer layer 5, which is a stretchable film containing the olefin-based elastomer and the inorganic filler described in the first embodiment; and surface layers 6, 7 stacked on the surfaces of the elastomer layer 5.

The elastomer layer 5 may further contain another component described in the first embodiment as long as stretchability of the stretchable film 10 is not impaired.

(Surface Layer)

The surface layers 6, 7 are layers for suppressing blocking in the stretchable film 10.

As shown in FIG. 2, the surface layers 6, 7 are provided on one or both of the first surface and the second surface of the elastomer layer 5, but are provided preferably on both of the first surface and the second surface of the elastomer layer 5 in light of sufficiently suppressing blocking in the stretchable film 10. The surface layers 6, 7 may be surface layers of the same type or different types.

The surface layers 6, 7 contain olefin-based resin (excluding olefin-based elastomer) and preferably further contain an inorganic filler. The surface layers 6, 7 may further contain another component if necessary as long as the effect of the present disclosure is not impaired.

<Olefin-Based Resin>

The olefin-based resin preferably has compatibility with the olefin-based elastomer in the elastomer layer 5, and preferred examples thereof include polyethylene resin and polypropylene resin. In light of improving stretchability of the surface layers 6, 7, the olefin-based resin is preferably polyethylene resin. In light of improving breathability of the surface layers 6, 7, olefin-based resin is preferably propylene resin.

Examples of the polyethylene resin include low-density polyethylene (LDPE), linear low-density polyethylene (LLDPE), high-density polyethylene (HDPE), etc.

Examples of the polypropylene resin include homo polypropylene (H-PP) obtained by polymerizing propylene alone, random polypropylene (R-PP) obtained by copolymerizing ethylene and propylene, block polypropylene (B-PP) obtained by polymerizing homo polypropylene and then copolymerizing ethylene and propylene in the presence of the homo polypropylene, etc. One kind of these olefin-based resins may be used alone, or two or more kinds of them may be used in combination.

In light of obtaining excellent stretchability, the content of the olefin-based resin relative to the entire surface layer is preferably from 30 mass % to 60 mass %, inclusive, more preferably from 40 mass % to 50 mass %, inclusive, relative to 100 mass % of the surface layer.

<Inorganic Filler>

The inorganic filler is a component for imparting slipperiness to the surfaces of the surface layers 5 and 6 to further suppress blocking in the stretchable film 10. The inorganic filler is a component for forming through holes 2 by formation of pores. By the stretching the stretchable film of this embodiment with the inorganic filler contained, the stretchable film can exhibit excellent breathability.

Examples of the inorganic filler include calcium carbonate, zeolite, silica, titanium oxide, calcium oxide, magnesium oxide, zinc oxide, clay, mica, barium sulfate, magnesium hydroxide, etc. One kind of these inorganic fillers may be used alone, or two or more kinds of them may be used in combination.

The content of the inorganic filler relative to the entire surface layer is preferably from 40 mass % to 70 mass %, inclusive, more preferably from 50 mass % to 60 mass %, inclusive, relative to 100 mass % of the surface layer. When the content of the inorganic filler is within the range described above, the stretching facilitates formation of pores.

The inorganic filler has a mean particle diameter of preferably 0.8 μm to 10 μm. When the inorganic filler has a mean particle diameter of 0.8 μm or more, secondary aggregation or the like of the inorganic filler is suppressed, and dispersibility in the resin becomes excellent. When the inorganic filler has a mean particle diameter of 10 μm or less, the texture is improved.

<Other Component>

Examples of the other component include an amide-based antiblocking agent (such as octadecanamide), a plasticizer, an ultraviolet absorber, an antioxidant, a weathering agent, an antistatic agent, a colorant, an anti-fogging agent, metal soap, wax, an antifungal agent, an antibacterial agent, a nucleating agent, a flame retardant, a lubricant, etc. These other components may be added to the material for the stretchable film in the form of a master batch.

<Through Hole>

Figure 3:
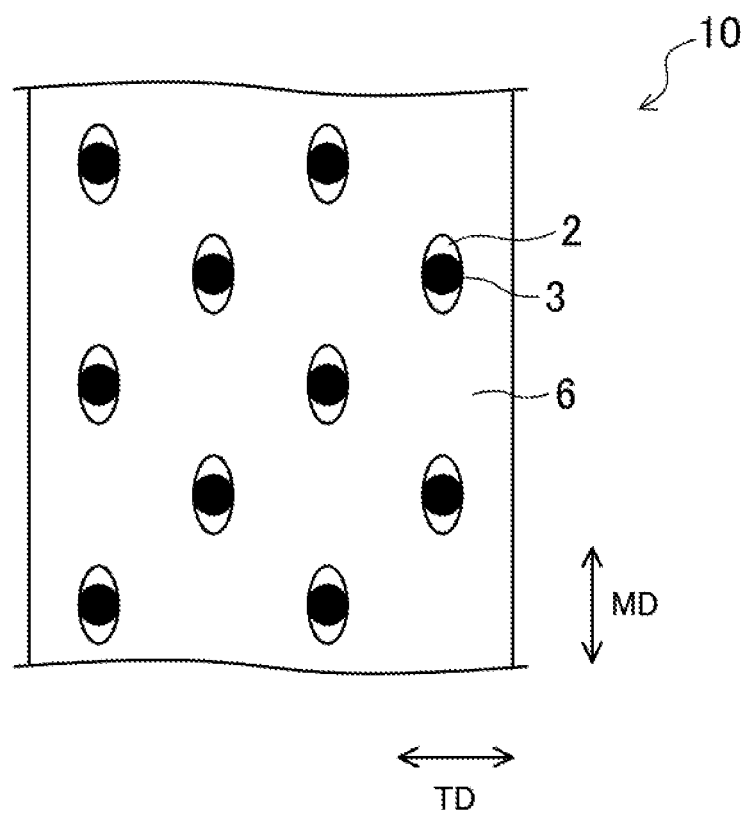
FIG. 3 is a plan view of a stretchable film according to the second embodiment of the present disclosure.

FIG. 3 is a plan view of the stretchable film according to the present embodiment. As shown in FIG. 3, the stretchable film 10 according to the present disclosure has multiple through holes 2. The through holes 2 are formed by stretching a raw film before formation of pores, as described below. The stretchable film 10 according to the present embodiment is configured such that the raw film containing the inorganic filler 3 described above is stretched to form pores.

FIG. 3 shows a stretchable film after stretching the film in the MD, but when the film is stretched in the TD, through holes 2 elongated in the TD are formed.

Further, when the surface layers 6, 7 contain the inorganic filler as mentioned above, it is possible to facilitate formation of pores when the stretching is performed. Each of the through holes 2 has a diameter of preferably 1 μm to 100 μm as in the first embodiment described above.

<Method for Producing Stretchable Film>

Next, a method for producing the stretchable film according to the present embodiment will be described in detail below.

For a stretchable film according to the present embodiment, first, in the same manner as in the first embodiment described above, the olefin-based elastomer and the inorganic filler, and another optional component such as the olefin-based resin are mixed in a predetermined mixing ratio, and the resultant mixture is then extruded in the form of a strand by, for example, a co-rotation twin screw extruder equipped with a strand die and cut to obtain pellets for forming an elastomer layer. Further, in the same manner, an olefin-based resin, an optional inorganic filler, and another optional component are mixed in a predetermined mixing ratio, and this mixture is then extruded in the form of a strand by, for example, a co-rotation twin screw extruder equipped with a strand die and cut to obtain pellets for forming a surface layer.

Next, the pellets for forming an elastomer layer and the pellets for forming a surface layer are extrusion-molded at a predetermined temperature using an extruder equipped with a T-die to obtain a raw film before formation of pores which has an elastomer layer, a first surface layer provided on a first surface of the elastomer layer, and a second surface layer provided on a second surface of the elastomer layer by a cast film process method.

The raw film is monoaxially stretched at the same stretching temperature and the same stretch ratio as in the first embodiment described above to form pores in the raw film, thereby producing a stretchable film 10 having multiple through holes 2 shown in FIG. 3. The stretching method is not particularly limited, and examples thereof include roll stretching, tenter stretching, gear stretching, etc.

The monoaxial stretching described above is stretching in one of MD or TD shown in FIG. 3. Biaxial stretching of stretching in both MD and TD may also be performed.

The stretchable film according to the present embodiment produced by the method described above has an air permeability measured by an Oken air permeability tester of 5000 s/100 ml or less and a permanent strain of 20% or less, as in the first embodiment, so that both excellent stretchability and excellent breathability can be achieved.

The raw film before stretching has a thickness of preferably 10 μm to 80 μm, more preferably 20 μm to 60 μm. When the thickness of the raw film is 10 μm or more, there is less wrinkling during winding, so that the ease of handling, such the ease of cutting in trimming at the time of slitting, can be ensured. When the thickness of the raw film is 80 μm or less, the stretchable film can obtain sufficient breathability.

In the raw film, the elastomer layer 5 has a thickness of preferably 10 μm to 70 μm, more preferably 20 μm to 50 μm. When the thickness of the elastomer layer 5 is 10 μm or more, the stretchable film 10 after the stretching can obtain sufficient stretchability. When the thickness of the elastomer layer 5 is 70 μm or less, the stretchable film 10 after the stretching can obtain sufficient breathability.

In the raw film, the surface layers 6, 7 has a thickness of preferably 1 μm to 6 μm, more preferably 2 μm to 4 μm. When the thickness of the surface layer 6, 7 is 1 μm or more, blocking in the stretchable film 10 after the stretching can be sufficiently suppressed, and breathability of the stretchable film 10 can be improved. When the thickness of the surface layer 6, 7 is 6 μm or less, sufficient stretchability of the stretchable film 10 can be obtained. The surface layers 6, 7 may have the same thickness or different thicknesses.

The thickness of the stretchable film 10 after the stretching is 40% to 60% of the raw film when heat stretching is performed, and is 80% to 100% of the raw film when stretching is performed at room temperature. For the gear stretching, an unstretched portion has the same thickness as that of the raw film, and a stretched portion is 80% to 100% of the raw film.

In particular, for the stretchable film 10 having a small ratio of the thickness of the surface layer 6, 7 to the entire stretchable film, the ratio between the thickness of the surface layer 6 (or the surface layer 7) of each of the raw film and the stretchable film 10 and the thickness of the elastomer layer 5 is preferably the surface layer:the elastomer layer=1: 10 to 1:35 in light of improving stretchability.

The stretchable film may be a single layer or a multilayer including two or more layers. When the stretchable film is a multilayer, the composition and thickness of each layer may be the same as or different from each other. When the stretchable film is a multilayer, the thickness thereof means the entire thickness of the multilayer.

EXAMPLES

The present disclosure will be described below based on Examples of the present disclosure. Note that the present disclosure shall not be limited to these examples. These examples may be modified and changed based on the intent of the present disclosure. Such a change and modification shall not be excluded from the scope of the present disclosure.

Materials used for production of a stretchable film are shown below:

(1) Inorganic filler: calcium carbonate (manufactured by SHIRAISHI CALCIUM KAISHA, LTD., trade name: PO-150B-10);
(2) LLDPE: linear low-density polyethylene, density: 0.92 g/cm$^3$, MFR: 2.3 g/10 minutes (manufactured by Dow Chemical Company, trade name: Dowlex2047G);
(3) HDPE: high-density polyethylene, density: 0.951 g/cm$^3$, MFR: 9.1 g/10 minutes (manufactured by ASAHI KASEI CORPORATION, trade name: Hizex2110JH);
(4) R-PP: random polypropylene, density: 0.90 g/cm$^3$, MFR: 6.7 g/10 minutes (manufactured by Prime Polymer Co., Ltd., trade name: F227);
(5) Propylene-based elastomer (Vistamaxx (registered trademark) 6102FL (manufactured by ExxonMobil, a propylene-ethylene copolymer, ethylene unit content: 16 mass %); and
(6) LDPE: low-density polyethylene, density: 0.922 g/cm$^3$, MFR: 0.3 g/10 minutes (trade name: SUMIKATHENE, F101-1, manufactured by Sumitomo Chemical Co., Ltd.).

Example 1

<Production of Stretchable Film>

First, materials shown in Table 1 were mixed, thereby preparing a material of Example 1 having the composition (parts by mass) shown in Table 1. Next, this material was extruded into a strand shape at 200° C. using a co-rotation twin screw extruder equipped with a strand die (manufactured by JSW, trade name: TEX28V-42CW-4V), and cut to obtain pellets.

Then, these pellets were melt-extruded (at the extrusion temperature: 200° C.) in a single screw extruder equipped with a T-die (manufactured by NAGATA SEISAKUSYO CO., LTD.) to form a film, and the film was wound up by a wind-up roll, thereby obtaining a raw film before formation of pores.

Subsequently, the raw film was uniaxially stretched in the MD at the stretching temperature and stretch ratio shown in Table 1, thereby forming pores in the raw film. Thus, a stretchable film having multiple through holes was produced.

<Measurement of Air Permeability>

Next, the air permeability of the stretchable film produced was measured by using an Oken air permeability tester (sec/100 cc) (manufactured by ASAHI SEIKO CO., LTD., trade name: EG01-6-1MR). In this measurement, the stretched film showing no breathability was expressed as 99999 (sec/100 cc). Table 1 shows the results.

<Measurement of Permanent Strain>

A strip-shaped test piece was cut from the stretchable film produced. The test piece had 100 mm in one direction of the film and 25 mm in the direction orthogonal to the one direction. The test piece was then fixed to grippers of a precision universal tester (Autograph AG-5000A manufactured by SHIMADZU CORPORATION) so that the distance between the grippers was 25 mm. The test piece was elongated in a longitudinal direction at a speed 254 mm/min so that an elongation (elongation ratio) calculated by the equation (1) above was 100%. Immediately after the elongation, the test piece was contracted at the same speed. The permanent strain [%] in each of the MD and the TD was then calculated from the equation (2) above. The test was performed at room temperature (23° C.±2° C.). Table 1 shows the results.

Examples 2 to 4

Each raw film having a thickness shown in Table 1 was stretched in the same manner as in Example 1 except that the composition (parts by mass) of the stretchable film and the conditions of the monoaxial stretching were changed to those shown in Table 1, thereby producing each stretchable film.

The air permeability and the permanent strain were measured in the same manner as in Example 1. Table 1 shows the results.

Example 5

<Production of Stretchable Film>

First, materials shown in Table 1 were mixed, thereby preparing a material for forming an elastomer layer and a material for forming a surface layer of Example 5 each having the composition (parts by mass) shown in Table 1. Next, each material was extruded into a strand shape at 200° C. using a co-rotation twin screw extruder equipped with a strand die (manufactured by JSW, trade name: TEX28V-42CW-4V), and cut to obtain pellets for forming an elastomer layer and pellets for forming a surface layer.

Then, the pellets for forming an elastomer layer and the pellets for forming a surface layer were extrusion-molded at 200° C. using an extruder equipped with a T-die (manufactured by Sumitomo Heavy Industries Modern, Ltd.) to obtain a film having an elastomer layer, a first surface layer provided on a first surface of the elastomer layer, and a second surface layer provided on a second surface of the elastomer layer by a cast film process method. The film was then wound up by a wind-up roll, thereby obtaining a raw film before formation of pores.

Subsequently, the raw film was uniaxially stretched in the MD at the stretching temperature and stretch ratio shown in Table 1, thereby forming pores in the raw film. Thus, a stretchable film having multiple through holes was produced.

The air permeability and the permanent strain were measured in the same manner as in Example 1. Table 1 shows the results.

Examples 6 to 16

Each raw film having a thickness shown in Tables 1 and 2 was stretched in the same manner as in Example 5 except that the composition (parts by mass) of the surface layer, the composition (parts by mass) of the elastomer layer, the ratio between the thickness of the surface layer and the thickness of the elastomer layer, and conditions of the monoaxial stretching were changed to those shown in Tables 1 and 2. Thus, stretchable films were produced.

The air permeability and the permanent strain were measured in the same manner as in Example 1. Tables 1 and 2 show the results.

Comparative Examples 1 to 9

Each raw film having a thickness shown in Table 3 was stretched in the same manner as in Example 5 except that the composition (parts by mass) of the surface layer, the composition (parts by mass) of the elastomer layer, the ratio between the thickness of the surface layer and the thickness of the elastomer layer, and conditions of the monoaxial stretching were changed to those shown in Table 3. Thus, each stretchable film was produced.

The air permeability and the permanent strain were measured in the same manner as in Example 1. Table 3 shows the results.

In Comparative Example 8, the ratio between the thickness of the surface layer and the thickness of the elastomer layer in the raw film was the surface layer:the elastomer layer=1:38. Thus, there are areas where the surface layer was not wrapped around the elastomer layer when the raw film was produced. Accordingly, a stretchable film could not be obtained.

In Comparative Example 9, the amount of the inorganic filler mixed in the elastomer layer was large. Thus, pellets for forming an elastomer layer could not be produced.

Therefore, in Comparative Examples 8 and 9, the air permeability and the permanent strain could not be measured.

TABLE 1

| | | | Example 1 | Example 2 | Example 3 | Example 4 | Example 5 | Example 6 | Example 7 | Example 8 |
|---|---|---|---|---|---|---|---|---|---|---|
| Surface layer | Mixing ratio (parts by mass) | Inorganic filler | — | — | — | — | 50 | 50 | 50 | 60 |
| | | LLDPE | — | — | — | — | 50 | — | — | — |
| | | HDPE | — | — | — | — | — | 50 | 50 | 40 |
| | | R-PP | — | — | — | — | — | — | — | — |
| Stretchable film (or elastomer layer) | Mixing ratio (parts by mass) | Inorganic filler | 60 | 60 | 60 | 60 | 60 | 60 | 60 | 65 |
| | | Propylene-based elastomer | 35 | 35 | 32 | 35 | 35 | 35 | 35 | 30 |
| | | LDPE | 5 | 5 | 8 | 5 | 5 | 5 | 5 | 5 |
| | | LLDPE | — | — | — | — | — | — | — | — |
| Thickness [μm] of raw film | First surface layer | | — | — | — | — | 2 | 2 | 2 | 2 |
| | Stretchable film (or elastomer layer) | | 40 | 40 | 40 | 40 | 36 | 36 | 36 | 36 |
| | Second surface layer | | — | — | — | — | 2 | 2 | 2 | 2 |
| | Entire thickness | | 40 | 40 | 40 | 40 | 40 | 40 | 40 | 40 |
| | Thickness of surface layer: Thickness of elastomer layer | | — | — | — | — | 1:18 | 1:18 | 1:18 | 1:18 |
| Stretching | Stretching method | | Longitudinal-direction stretching | Longitudinal-direction stretching | Longitudinal-direction stretching | Gear stretching | Longitudinal-direction stretching | Longitudinal-direction stretching | Longitudinal-direction stretching | Longitudinal-direction stretching |
| | Stretching direction | | MD | MD | MD | TD | MD | MD | MD | MD |
| | Stretching temperature [° C.] | | 60 | Room temperature | Room temperature | Room temperature | 60 | 60 | 60 | 60 |
| | Stretch ratio [-] | | 3 | 4 | 4 | 5 | 3 | 2 | 3 | 3 |
| Evaluations | Air permeability [s/100 ml] | | 1758 | 3660 | 2990 | 4947 | 3464 | 3980 | 1000 | 620 |
| | Permanent strain [%] in MD | | 19.4 | 7.6 | 8.5 | 21.8 | 19.5 | 21.5 | 19.2 | 19.8 |
| | Permanent strain [%] in TD | | 15.6 | 14.3 | 14.8 | 9.0 | 16.2 | 19.1 | 17.1 | 17.5 |

TABLE 2

| | | | Example 9 | Example 10 | Example 11 | Example 12 | Example 13 | Example 14 | Example 15 | Example 16 |
|---|---|---|---|---|---|---|---|---|---|---|
| Surface layer | Mixing ratio (parts by mass) | Inorganic filler | 50 | 50 | 50 | 50 | 50 | 50 | 50 | 50 |
| | | LLDPE | — | — | — | — | — | — | — | — |
| | | HDPE | — | — | — | — | — | — | — | — |
| | | R-PP | 50 | 50 | 50 | 50 | 50 | 50 | 50 | 50 |
| Stretchable film (or elastomer layer) | Mixing ratio (parts by mass) | Inorganic filler | 60 | 60 | 60 | 60 | 60 | 60 | 60 | 60 |
| | | Propylene-based elastomer | 35 | 35 | 35 | 35 | 35 | 35 | 35 | 35 |
| | | LDPE | 5 | 5 | 5 | 5 | 5 | 5 | 5 | 5 |
| | | LLDPE | — | — | — | — | — | — | — | — |

TABLE 2-continued

|  |  | Example 9 | Example 10 | Example 11 | Example 12 | Example 13 | Example 14 | Example 15 | Example 16 |
|---|---|---|---|---|---|---|---|---|---|
| Thickness [μm] of raw film | First surface layer | 1.5 | 1.5 | 1.5 | 2 | 2 | 2 | 3 | 3 |
|  | Stretchable film (or elastomer layer) | 37 | 37 | 37 | 36 | 36 | 36 | 34 | 34 |
|  | Second surface layer | 1.5 | 1.5 | 1.5 | 2 | 2 | 2 | 3 | 3 |
|  | Entire thickness | 40 | 40 | 40 | 40 | 40 | 40 | 40 | 40 |
|  | Thickness of surface layer: Thickness of elastomer layer | 1:25 | 1:25 | 1:25 | 1:18 | 1:18 | 1:18 | 1:11 | 1:11 |
| Stretching | Stretching method | Longitudinal-direction stretching | Gear stretching | Longitudinal-direction stretching | Longitudinal-direction stretching | Gear stretching | Longitudinal-direction stretching | Gear stretching | Gear stretching |
|  | Stretching direction | MD | TD | MD | MD | TD | MD | TD | MD |
|  | Stretching temperature [° C.] | 60 | Room temperature | Room temperature | 60 | Room temperature | Room temperature | Room temperature | Room temperature |
|  | Stretch ratio [-] | 3 | 5 | 3 | 3 | 5 | 3 | 5 | 3 |
| Evaluations | Air permeability [s/100 ml] | 2109 | 4188 | 3512 | 1210 | 3736 | 3131 | 3889 | 3323 |
|  | Permanent strain [%] in MD | Ruptured | 28.1 | 12.2 | Ruptured | 27.6 | 11.8 | 28.1 | 12.2 |
|  | Permanent strain [%] in TD | 18.3 | 9.5 | 16.9 | 19.2 | 9.7 | 17.2 | 10.6 | 19.2 |

TABLE 3

|  |  |  | Comparative example 1 | Comparative example 2 | Comparative example 3 | Comparative example 4 | Comparative example 5 | Comparative example 6 | Comparative example 7 | Comparative example 8 | Comparative example 9 |
|---|---|---|---|---|---|---|---|---|---|---|---|
| Surface layer | Mixing ratio (parts by mass) | Inorganic filler | 50 | 50 | 50 | 50 | 60 | 50 | — | 50 | 1 |
|  |  | LLDPE | 50 | 50 | 50 | — | — | — | — | — | — |
|  |  | HDPE | — | — | — | 50 | 40 | — | — | — | — |
|  |  | R-PP | — | — | — | — | — | 50 | — | 50 | — |
| Stretchable film (or elastomer layer) | Mixing ratio (parts by mass) | Inorganic filler | 60 | 60 | 60 | 60 | 60 | 60 | 60 | 60 | 70 |
|  |  | Propylene-based elastomer | 35 | 35 | 35 | 35 | 40 | 40 | 30 | 35 | 28.5 |
|  |  | LDPE | 5 | 5 | 5 | 5 | — | — | — | 5 | 1.5 |
|  |  | LLDPE | — | — | — | — | — | — | 10 | — | — |
| Thickness [μm] of raw film | First surface layer |  | 4 | 2 | 4 | 2 | 4 | 2 | — | 1 | — |
|  | Stretchable film (or elastomer layer) |  | 32 | 36 | 32 | 36 | 32 | 36 | 40 | 38 | — |
|  | Second surface layer |  | 4 | 2 | 4 | 2 | 4 | 2 | — | 1 | — |
|  | Entire thickness |  | 40 | 40 | 40 | 40 | 40 | 40 | 40 | 40 | — |
|  | Thickness of surface layer: Thickness of elastomer layer |  | 1:8 | 1:18 | 1:8 | 1:18 | 1:8 | 1:18 | — | 1:38 | — |
| Stretching | Stretching method |  | Longitudinal-direction stretching | Longitudinal-direction stretching | Longitudinal-direction stretching | Longitudinal-direction stretching | Longitudinal-direction stretching | Longitudinal-direction stretching | Longitudinal-direction stretching | — | — |
|  | Stretching direction |  | MD | MD | MD | MD | MD | MD | MD | — | — |
|  | Stretching temperature [° C.] |  | 60 | 70 | 60 | 60 | Room temperature | Room temperature | 60 | — | — |
|  | Stretch ratio [-] |  | 3 | 1.5 | 2 | 1.5 | 3.8 | 3 | 4 | — | — |
| Evaluations | Air permeability [s/100 ml] |  | 2201 | Ruptured | 9211 | 30983 | 13461 | 99999 | 12000 | — | — |
|  | Permanent strain [%] in MD |  | 33.0 | — | 33.1 | 22.7 | 10.3 | 11.8 | 29.7 | — | — |
|  | Permanent strain [%] in TD |  | 25.0 | — | 23.1 | 17.6 | 17.7 | 17.2 | 14.0 | — | — |

As can be seen from Tables 1 and 2, the stretchable films of Examples 1 to 16 each had the air permeability measured by the Oken air permeability tester of 5000 s/100 ml or less and the permanent strain in at least one of the MD or the TD of 20% or less, and thus, both excellent stretchability and excellent breathability could be achieved.

In contrast, as can be seen from Table 3, the stretchable film of Comparative Example 1 had a ratio between the thickness of the surface layer and the thickness of the elastomer layer in the raw film of the surface layer:the elastomer layer=1:8, so that the proportion of the surface layer increased, which caused an increase in the proportion of the resin component having poor elastomeric properties, resulting in poor stretchability (the permanent strain was more than 20%).

For the stretchable film of Comparative Example 2, the stretching temperature at the time when the film was formed in the monoaxial stretching was 70° C. or higher. Thus, the stretchable film was melted and ruptured.

The stretchable film of Comparative Example 3 had a ratio between the thickness of the surface layer and the thickness of the elastomer layer in the raw film of the surface layer:the elastomer layer=1:8, so that the proportion of the surface layer increased, which caused an increase in the proportion of the resin component having low elastomeric properties, resulting in poor stretchability (the permanent strain was more than 20%). In addition, the stretch ratio was low, and thus, pores did not open sufficiently, resulting in poor breathability (the air permeability was larger than 5000 s/100 ml).

For the stretchable film of Comparative Example 4, the stretch ratio at the time when the film was formed in the monoaxial stretching was smaller than 1.8 times. Thus, formation of pores in the monoaxial stretching was not promoted, resulting in poor breathability (the air permeability was larger than 5000 s/100 ml).

The stretchable film of Comparative Example 5 had a ratio between the thickness of the surface layer and the thickness of the elastomer layer in the raw film of the surface layer:the elastomer layer=1:8, and LDPE was not mixed in the elastomer layer, so that separation between the resin and the inorganic filler was less likely to occur, resulting poor breathability (the air permeability was larger than 5000 s/100 ml).

For the stretchable film of Comparative Example 6, LDPE was not mixed in the elastomer layer, so that separation between the resin and the inorganic filler was less likely to occur, and breathability was not at all shown (the air permeability was shown as 99999 s/100 ml).

For the stretchable film of Comparative Example 7, LDPE was not mixed in the elastomer layer, so that separation between the resin and the inorganic filler was less likely to occur, resulting in poor breathability (the air permeability was larger than 5000 s/100 ml).

As can be seen from above, the present disclosure is suitable for a stretchable film used for clothes such as underwear, a waistband of a paper diaper, a side panel, a leg gather, an incontinence article, a sanitary napkin, a bandage, a surgical drape, a fastening band, a hat, swimming pants, a sports supporter, a medical supporter, an adhesive plaster, and the like, and a method for producing the stretchable film.

The invention claimed is:

1. A stretchable film including: an olefin-based elastomer; an inorganic filler; and a low-density polyethylene,
a content of the olefin-based elastomer being from 15% by mass to 50% by mass relative to the total mass of the stretchable film,
a content of the inorganic filler being from 50% by mass to 70% by mass relative to the total mass of the stretchable film,
a content of the low-density polyethylene being less than 10% by mass relative to the total mass of the stretchable film,
the stretchable film having an air permeability measured by an Oken air permeability tester of 5000 s/100 ml or less, and
the following permanent strain in at least one direction of 20% or less,
(Permanent Strain of Stretchable Film)
a strip-shaped test piece is cut from the stretchable film, the test piece having 100 mm in one direction of the film and 25 mm in a direction orthogonal to the one direction, the test piece is then fixed to grippers of the tester so that a distance between the grippers is 25 mm, the test piece is elongated in a longitudinal direction at a speed 254 mm/min so that an elongation (elongation ratio) calculated by the following equation (1) is 100%, immediately after the elongation, the test piece is contracted at the same speed, and the permanent strain [%] is calculated from the following equation (2), $$\text{Elongation}[\%]=(L1-L0)/L0\times100 \qquad (1)$$

$$\text{Permanent Strain}[\%]=(L2-L0)/L0\times100 \qquad (2)$$

where L0 is a distance (mm) between the grippers before the elongation, L1 is a distance (mm) between the grippers after the elongation, and L2 is a distance (mm) between the grippers when a load (N/25 mm) of the test piece becomes 0 during the contraction.

2. The stretchable film of claim 1, wherein the stretchable film is stretched in at least one direction.

3. The stretchable film of claim 1, wherein the olefin-based elastomer is a propylene-based elastomer.

4. The stretchable film of claim 1, wherein the stretchable film has multiple through holes.

5. A stretchable film comprising:
an elastomer layer including an olefin-based elastomer, an inorganic filler, and a low-density polyethylene; and
a surface layer stacked on at least one surface of the elastomer layer, the surface layer including an olefin-based resin and excluding olefin-based elastomers,
a content of the olefin-based elastomer being from 15% by mass to 50% by mass relative to the total mass of the elastomer layer,
a content of the inorganic filler being from 50% by mass to 70% by mass relative to the total mass of the elastomer layer,
a content of the low-density polyethylene being less than 10% by mass relative to the total mass of the elastomer layer,
the stretchable film having an air permeability measured by an Oken air permeability tester of 5000 s/100 ml or less, and
the following permanent strain in at least one direction of 20% or less,
(Permanent Strain of Stretchable Film)
a strip-shaped test piece is cut from the stretchable film, the test piece having 100 mm in one direction of the film and 25 mm in a direction orthogonal to the one direction, the test piece is then fixed to grippers of the tester so that a distance between the grippers is 25 mm, the test piece is elongated in a longitudinal direction at a speed 254 mm/min so that an elongation (elongation ratio) calculated by the following equation (3) is 100%, immediately after the elongation, the test piece is contracted at the same speed, and the permanent strain [%] is calculated from the following equation (4), $$\text{Elongation}[\%]=(L1-L0)/L0\times100 \qquad (3)$$

$$\text{Permanent Strain}[\%]=(L2-L0)/L0\times100 \qquad (4)$$

where L0 is a distance (mm) between the grippers before the elongation, L1 is a distance (mm) between the grippers after the elongation, and L2 is a distance (mm) between the grippers when a load (N/25 mm) of the test piece becomes 0 during the contraction.

6. The stretchable film of claim 5, wherein a ratio between a thickness of the surface layer and a thickness of the elastomer layer is from 1:10 to 1:35.

* * * * *